Jan. 3, 1939.   F. E. P. KLAGES   2,142,789
APPARATUS FOR REGULATING MOISTURE CONTENT OF MATERIALS
Filed Jan. 2, 1935

Inventor:
Frank E. P. Klages
By: Newman & Newman
Attys.

Patented Jan. 3, 1939

2,142,789

UNITED STATES PATENT OFFICE 2,142,789

APPARATUS FOR REGULATING MOISTURE CONTENT OF MATERIALS

Frank E. P. Klages, Park Ridge, Ill., assignor to The Powers Regulator Company, Chicago, Ill.

Application January 2, 1935, Serial No. 48

2 Claims. (Cl. 236—1)

My invention relates to novel means for determining the humidity or moisture content of air drawn from the surface of a moving body of material, such as yarn, after it emerges from a slasher, or paper in process of manufacture, and to the method of operating such apparatus.

The subject matter of this application was first disclosed in my application Serial No. 709,563, filed February 3, 1934, which said application was abandoned in favor of my application Serial No. 742,529, filed September 4, 1934, as a continuation of said first-named application. Application Serial No. 742,529 has resulted in Patent No. 2,038,431, dated April 21, 1936.

It has long been the custom, in order to determine relative humidity, to provide wet and dry bulb instruments and to control moisture content of air by apparatus operated by the differential of the pressures developed by the two instruments; or, as an alternative, to operate the control means manually under the guidance of information obtained by readings of the wet and dry bulb instruments.

This theory has, likewise, been applied to the determination of the moisture content of materials, the determination being secured by continuously testing a mixture of air and water vapor drawn from the surface of the moving body of the material. A determination has also been made by the use of a wet bulb alone, as in the case of my prior Patent No. 1,633,817.

There is, however, a fundamental fault in any method of determination of moisture content of a mixture of air and water vapor in which is used either a wet and dry bulb combined, a wet bulb alone or a dry bulb alone, for the reason that no one or combination of these instrumentalities is correctly influenced by fluctuations in the total heat of the mixture.

The relative proportions and pressure of the air and vapor being known, each unit of a mixture thereof contains a known quantity of B. t. u. which represents the total heat of the unit. A change in the relative proportions of the air and vapor will change the total heat of the unit which will vary to a much greater extent than the sensible heat of the mixture.

Obviously, a dry bulb is influenced only by the sensible heat of the medium in which it is placed. A wet bulb will give off water vapor and be cooled at all times when the mixture of air and water vapor flowing past the wet bulb is less than saturated, the fluctuations in the action of the wet bulb being brought about by variations in the amount of water vapor that it gives off. A wet bulb never takes on water vapor from the surrounding medium, being constantly saturated from its own source. Neither is the wet bulb materially affected by changes in the sensible heat; at least not to the extent that a dry bulb is so influenced, for the reason that the wet bulb is maintained at substantially the temperature of the relatively large body of water that constitutes its source of supply, the temperature of which changes very slowly.

Another reason why any regulating device that is operated on or is largely influenced by sensible heat is inaccurate, is that a certain percentage of the medium in contact with the bulb consists of air drawn from the exterior of the machine. It is quite conceivable that at one time the surrounding air might be at a temperature of 60 and another time of 100, which would, of course, influence to a very great extent the temperature of the mixture and result in an entirely incorrect regulation. In my construction the temperature of the air has not a pronounced influence because the instrument operates largely by relative humidity, and, regardless of temperature, the medium is at all times near to saturation.

There is, therefore, no means in the wet bulb, the dry bulb or the combination thereof that would furnish an accurate indication of a change, however slight, in the latent heat of the medium, in other words, there is no instrumentality that will absorb water vapor from the medium and actually add latent heat to the wet bulb. As explained, a wet bulb always gives off heat, the rate of heat dissipation varying according to the variations in the moisture content of the medium.

In the operation of my hygroscopic bulb it may be assumed that normally the moisture condition of the fabric covering and that of the surrounding medium will be in balance. However, with a reduction in the water vapor in the medium (and a consequent slight reduction in the sensible heat of the medium) water is given off from the fabric covering, thus cooling the bulb and bringing about an adjusting action. This continues until the medium contains a greater proportion of water vapor (and a consequently higher sensible heat) when the fabric will begin to take on instead of give off water; this will add heat to the bulb and again bring about an adjusting action.

The hygroscopic bulb of my invention includes a fabric covering of light texture relative to the wicking ordinarily used in connection with a wet bulb, and no means are provided for supplying water to the fabric other than at the time of starting the machine in operation.

It will be obvious from the later description that the medium operated on has at all times a high relative humidity, that is, close to saturation; it may for short periods be saturated, but this condition will quickly be corrected by a change in the adjustment that will cause the material to be more completely dried before it reaches the point at which the testing medium is drawn from its surface.

The principle of operation of the hygroscopic bulb of my invention appears to be explained by the statement that there is an actual change of water between the fabric on the bulb and the medium, water being absorbed by the fabric at one period and given off by the fabric at another period, the ideal point of adjustment being that at which there is no water exchanged; and in addition by the statement that it acts in response to changes in the sensible heat as well as in the latent heat. The described theory is confirmed by the fact that, in starting, unless the wick surrounding the bulb is previously wetted it will absorb water from the medium and the regulation will be abnormal and incorrect until the fabric has absorbed a quantity of water to bring it into balance with the moisture in the medium; thereafter the regulation will be correct. Even under those circumstances the bulb does not act as a wet bulb because a wet bulb does not absorb moisture, only giving it off.

The invention may be applied to many different forms of control devices, no effort being made herein to connect up the primary controlling device to any form of secondary regulating apparatus. However, I have shown in the accompanying drawing one simple arrangement that will now be described.

Figure 1:
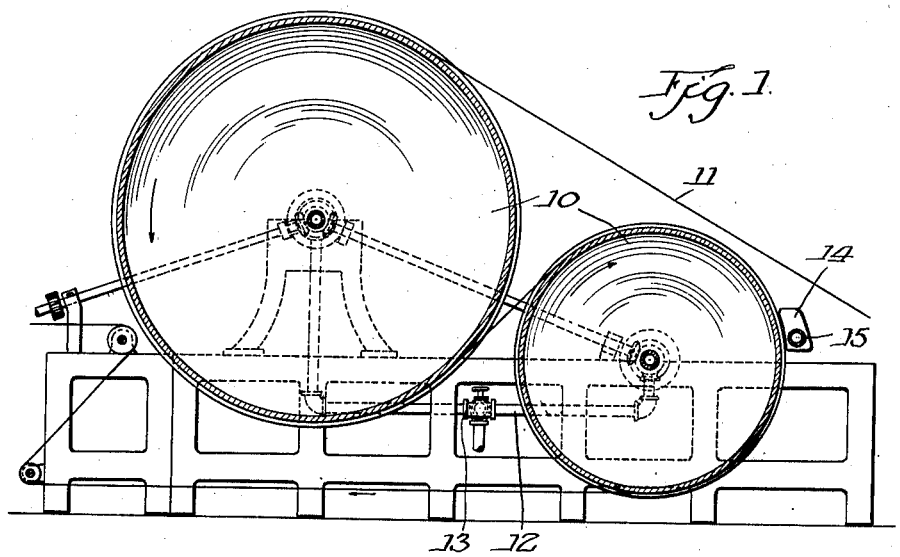
Fig. 1 is a side elevation of a portion of a slasher showing the drums and the device used for withdrawing moisture-laden air from the surface of material passing over the drums.
Figure 2:
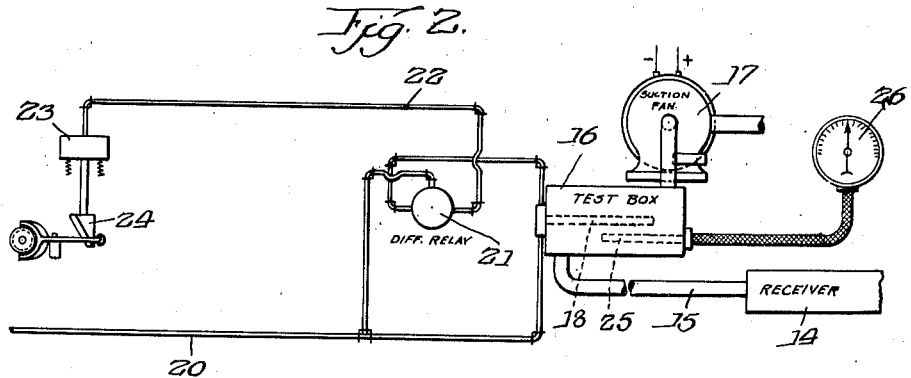
Fig. 2 is a diagram showing the arrangement of the necessary parts for control of moisture.
Figure 3:
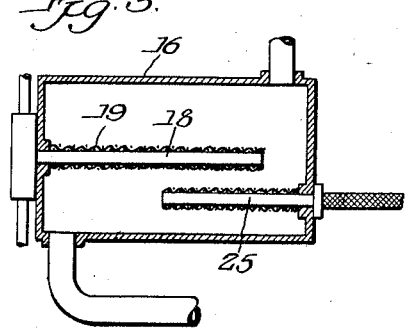
Fig. 3 is a sectional view through the testing box in which the bulb heretofore discussed is inserted.

In Fig. 1, I have shown the drums 10 of a conventional slasher, the warp being indicated at 11. Heat is supplied to the drums through a pipe 12, a hand valve 13 being shown. This may be a hand-controlled reducing valve so arranged that during normal operation a fixed heat supply will be furnished to the drums, the hand operation being used for changing the heat supply in starting.

A receiver 14 in the form of an open-sided box is placed in such position relative to a drum that it lies close to the surface of the warp passing over the drum, and a pipe 15 connects the receiver to a test box 16. An exhaust fan 17 serves to pull air from the surface of the drum through the box. This air will be relatively highly heated and will normally be of high relative humidity. The position of the receiver relative to the completion of the drying operation should be such that the air drawn over the surface of the material contains a relatively large proportion of water vapor, as regulation under this condition can be effected more closely.

Mounted within the test box is a single heat-sensitive bulb 18 having a wick or fabric sleeve 19 overlying the same. The bulb acts to control a supply of air from a supply pipe 20 to a relay 21, the relay being connected through a pipe 22 to a diaphragm motor 23. This motor may operate speed-changing mechanism 24 for varying the speed of operation of the drums 10, or a heat-regulating valve, or other means for varying the amount of drying heat supplied to the material being treated.

Inasmuch as the regulation effect is secured by reason of the hygroscopic action of the material that covers the bulb, it is obvious that the character of the material may be changed and other materials than fabric may be used so long as such materials have capacity for absorbing water vapor from the air and giving off water vapor to the air.

As heretofore stated, the regulation is effected solely by the single bulb and no means is used for supply water to the wick on the bulb. It has been found that slight variations in the moisture content of the material will be reflected by the bulb arranged as indicated.

During the process of starting, it being assumed that the wick on the bulb 18 is dry, it has been found to be desirable to saturate the wick and to operate the valve 13 to substantially increase the amount of heat supplied to the drums. In order to accurately determine the point at which the increased amount of heat should be discontinued, I provide a wick-covered bulb 25 adapted to be inserted in the test box and connected to an indicating thermometer 26. Inasmuch as the heat affecting the bulb 25 will be the same as that affecting the bulb 18, and as the normal operating temperature of the withdrawn vapor corresponding to the correct moisture content of the material will be known, the starting operation as described will be continued until the thermometer shows that predetermined temperature, at which point the hand valve will be operated to reduce the temperature of the drums to the normal operating condition. While the thermometer may be useful in checking operation from time to time, it is not a requisite and is not actually required except during starting.

The term "hygroscopic bulb" as used herein is intended as a generic term to cover any heat sensitive bulb having a covering, all or in part, of a hygroscopic material, and without any means associated therewith for supplying water to the covering other than the water that may be abstracted from the medium that is caused to flow over and around the bulb.

As heretofore stated, the invention is intended for use in controlling the moisture content of many different forms of material undergoing the process of drying, and, furthermore, is adapted for control of the heat relative to the period of time during which the material is exposed to the heat.

The idea disclosed herein is applicable to many different forms of apparatus for indicating or controlling the moisture content of air or other gases and I do not wish to be limited except as indicated in the appended claims.

I claim:

1. A heat sensitive element for use in determining the moisture content of a body of air, comprising a rigid metallic container for a heat sensitive fluid, and a hygroscopic material applied to the exterior of said container and adapted to exchange moisture with a moisture-containing medium and be substantially entirely influenced by the latent heat of the moisture in the medium and to receive its sole supply of moisture from said medium.

2. In combination with a testing bulb having hygroscopic material overlying the same to control the supply of heat to a moving body of material, heating means, and means close to and overlying the heating means and the material to serve as a source of supply of substantially saturated air and the sole source of supply of moisture for the hygroscopic material, said testing bulb being actuated to control the heat supply by variations in the heat and moisture content in the air, the bulb being highly sensitive to heat variations in the air due to the normally high moisture content of the air.

FRANK E. P. KLAGES.